March 24, 1964 R. A. MATTSON 3,126,479
X-RAY ANALYZER SYSTEM WITH IONIZATION DETECTOR CONTAINING
NITROGEN, HELIUM AND A LOW ATOMIC NUMBER OF QUENCHING GAS
Filed March 1, 1962

INVENTOR.
RODNEY A. MATTSON
BY Ralph G. Hohenfeldt
ATTORNEY

United States Patent Office 3,126,479
Patented Mar. 24, 1964

3,126,479
X-RAY ANALYZER SYSTEM WITH IONIZATION DETECTOR CONTAINING NITROGEN, HELIUM AND A LOW ATOMIC NUMBER OF QUENCHING GAS
Rodney A. Mattson, New Berlin, Wis., assignor to General Electric Company, a corporation of New York
Filed Mar. 1, 1962, Ser. No. 176,595
6 Claims. (Cl. 250—51.5)

This invention pertains to a system for analyzing materials for their chemical constitution with X-radiation, and in particular, to a gaseous radiation detector for use in such a system.

The detector using a new gas will be described in connection with an X-ray emission analysis system although it has general application. The emission analysis procedure involves placing a sample whose quantitative elemental composition is unknown in the beam from a primary X-ray source. If the beam energy exceeds the threshold level for the elements the latter emit secondary X-radiations whose wavelengths are characteristic of the elements present. The characteristic radiation wavelengths from the low atomic number elements are longer and of lower quantum or photon energy than the emitted radiation from the higher atomic number elements. A wavelength coinciding with the characteristic of an element is known as the emission spectra or spectral line of that element.

The radiation intensity due to an element is indicative of the quantity of the element present, so that it is necessary to measure the intensity of each spectral line separately. This is usually done with a monochromating crystal that diffracts radiation of a distinctive wavelength into respective detectors placed at the well known Bragg angles which are the angles between the axis of the beam incident upon the crystal and the axis of the detector. Concurrently, with the emission of characteristic spectra there is a scattering of polychromatic background radiation from the X-ray source by the sample. The more energetic primary radiation is scattered most intensely and the presence of low atomic number elements in the sample matrix enhances scattering. The crystal prevents much of the scattered background radiation from being diffracted to the detector but some enters anyway because the crystal itself and surrounding components on which radiation impinges tends to scatter and produce background radiation.

A common X-ray detector, also known as a counter, in connection with which the invention will be described is the Geiger-Mueller type. This type contains a gas filling which is susceptible to being ionized, that is, to the liberation of an electron by an entering X-ray photon. The ionizing gas is contained by an envelope comprising an A D.C. potential applied between the anode and cathode cylinder having an axial anode wire insulated from it. A D.C. potential applied between the anode and cathode results in producing an intense electric field near the anode wire that causes the initial electron to collide with other gas atoms and liberate more electrons with an amplification factor largely dependent upon the D.C. potential. Thus, a pulse of electrons is collected on the anode wire and by suitable electronics the pulse may be amplified to a usable level. As explained in the preceding paragraph, both desirable characteristic and undesirable background radiations are simultaneously intercepted by the detector. A concomitant of this is that a family of pulses with different heights is produced by nearly coincident ionizing events due to photons of different energies. Consequently, determining the characteristic radiation intensity due to photons from one element by means of the rate at which pulses are produced ordinarily requires that an electronic discriminator be used for segregating the desired from the undesired pulses. Devices for discriminating or selecting pulses according to their height are well known. Avoiding their use is desirable, however, because of the cost, space requirements and complexity which they introduce.

The characteristic radiation from low atomic number elements undergoes appreciable absorption by air in the path between the sample and detector. To diminish this effect, the analysis is often conducted in a vacuum or a confined atmosphere of light gas such as helium or hydrogen. Very thin entrance windows are employed in the detectors to reduce absorption of incoming X-rays. In some cases they are so thin and porous that they are inclined to leak ionizing gas out of the detector or ambient gas into it. It is customary to flow the ionizing gas constantly through the detector tube at a controlled pressure slightly in excess of ambient pressure so that an uncontaminated uniform gas is always present in the detector, resulting in its stable operation. This creates a combination technical and economic problem because some of the known elemental gases and gas mixtures that are especially sensitive to being ionized by a spectral line of interest are prohibitively expensive. For instance, neon gas is useful for detecting low energy photons but it costs over one thousand dollars per tank. Although the gas flow rate is relatively small, it represents a significant expenditure in X-ray emission analyzers that serve as on-line gages for continuous analysis and process control.

An example of an on-line analyzer in which the new detector has utility is one with multiple channels for determining the amount of various elements present in a complex of raw material such as a raw Portland cement mix. The elements of interest in such a mixture are usually known to be compounded as silicates, oxides and carbonates. The characteristic radiation intensities from these elements reveal the amount of the compound present. Elements of interest in a cement mix are usually magnesium, aluminum, silicon, potassium, calcium and iron which range between atomic number 12 and 26. Magnesium yields characteristic K alpha radiation whose wavelength is about 9.88 A. (Angstroms). Its photon voltage equivalent is approximately 1.254 kilovolts. Its neighbor aluminum, has atomic number 13, K alpha radiation at about 8.33 A. and photon energy of about 1.487 kilovolts. Iron with an atomic number 26 at the other end of the range has a K alpha radiation at about 1.93 A. and photon energy at about 6.398 kilovolts. X-ray tubes used for such analysis often have either a chromium or molybdenum target which produce polychromatic radiation which may be generally scattered by the sample as background which is intercepted by the detector. Chromium and molybdenum targets also produce pronounced characteristic emission lines at 2.29 A. and .709 A. respectively, or 5.408 kilovolts and 17.425 kilovolts. These characteristic lines are intensely scattered by the sample and appear in the detector. It is seen, then, that a detector which is used for low energy aluminum characteristic radiation may be subjected to a broad spectrum of interfering radiation.

An object of the present invention is to provide a radiation detector that is sensitive to low energy photons but relatively insensitive to high energy photons. Other objects are to control the sensitivity of a detector over a desired photon energy range by a new ionizing gas mixture, which gas is readily obtainable and so inexpensive as to make it particularly suitable for use in on-line X-ray analyzers.

A more specific object is the provision of a detector tube gas whose constituents are nitrogen, helium and methane as a quenching agent or a combination of the first two gases with another quenching gas.

A more general object is to provide a more effective and economical X-ray analyzing apparatus.

Achievement of the aforegoing and other more specific objects will appear from time to time throughout the course of the ensuing specification.

An illustrative embodiment of the invention will now be described in reference to the drawing in which.

Figure 3:
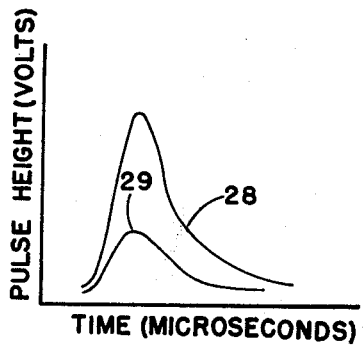
Figure 4:
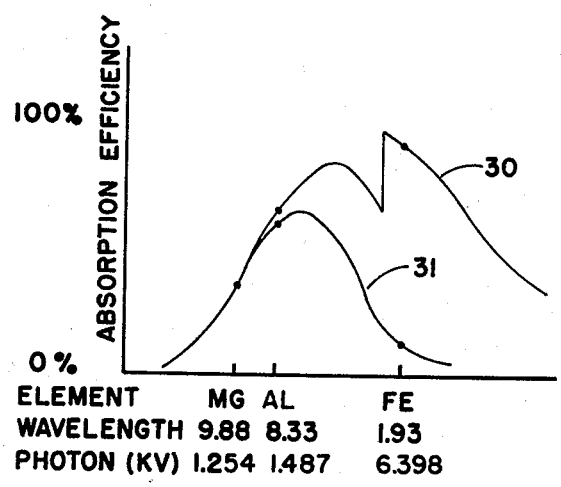
Figure 5:
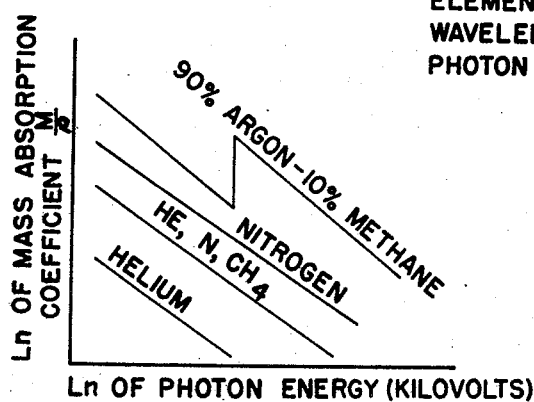

FIG. 3 typifies pulses produced by the detector tube;

FIG. 4 shows the curves resulting from plotting photon absorption efficiency for a known type of detector gas and the new gas against photon energy; and, FIG. 5 is a graph of the logarithm (Ln) of mass absorption coefficients for various gases plotted against logarithms (Ln) of photon energy.

Figure 1:
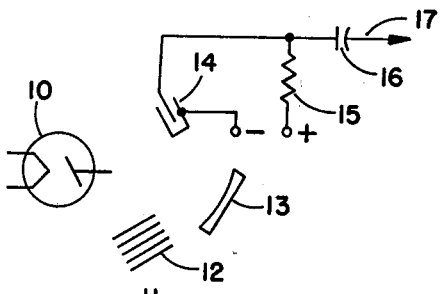
FIG. 1 is a schematic representation of the basic components of an X-ray emission analyzer in which the invention may be used.

FIG. 1 shows an arrangement for X-ray emission analysis in which a detector with the new ionizing gas mixture may be employed. Item 10 is a radiation source such as an X-ray tube which is positioned for irradiating a sample 11 and exciting it to emit secondary radiation characteristics of at least some of its constituent elements. The emitted radiation together with background radiation scattered by the sample is collimated by a plurality of closely spaced foils 12 which direct radiation toward a monochromating diffraction crystal 13. Crystal 13 may be ethylenediamine ditartrate (EDT) or other suitable material whose choice is dependent upon factors known to those versed in the art. The crystal diffracts the spectra of one element primarily but it also scatters some background radiation into X-ray detector 14.

The cathode cylinder of detector tube 14 is connected to the negative side of a D.C. power supply and its anode wire to the positive side through a decoupling resistor 15 as indicated by the polarity markings. Entry of a photon or photons into detector 14 when its D.C. source is connected results in some of the molecules or atoms of its gas fill being ionized without recombining. That is, free electrons and positive ions are formed. The free electrons, under the influence of the intense electric field in the detector 14, ionize additional gas atoms and produce more electrons and positive ions. The extremely mobile electrons are collected by the anode in a part of a microsecond and a pulse whose voltage amplitude is proportional to the energy of the photons forms on a capacitor 16. The pulses may be fed to an amplifier, not shown, over an output line 17. The other phenomena occurring in the detector in connection with an ionizing event will not be discussed because they are known to those versed in the radiation detector art.

An assumption is made that the voltage applied to detector tube 14 will cause it to operate in its proportional range where the amplification is such that the output pulse amplitudes will be proportional to the energy of the incoming photons. The detector may also be operated at higher voltages in the well known Geiger-Mueller range, but that is not the intent for present purposes since in that mode each incoming photon causes pulses of the same amplitude regardless of its energy in which case information about the intensity of photons at a particular energy level is lost.

Use of a conventional D.C. power supply that maintains a stable voltage on the detector tube 14 is assumed. The voltage range may extend from 500 to 3000 volts but the detector is usually operated at a particular voltage. In one detector utilizing the new gas filling, a voltage of about 2000 volts is applied. It is also assumed that the X-ray tube power supply will be a relatively stable one that allows close control over the filament current and accelerating voltage of the tube.

Figure 2:
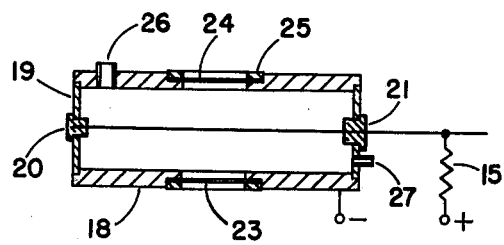
FIG. 2 is a typical detector tube using the new ionizing gas.

A more detailed view of a conventional gas flow detector tube in which the new gas may be used is shown in FIG. 2. It comprises a metal cathode cylinder 18 which may be of stainless steel, or other metal that does not react with the gas, and is provided at opposite ends with closure plates 19 that may be conventionally welded in place. At the center of plates 19 are provided sealed-in insulators 20, 21. A centrally located anode wire 22, of tungsten in this case, is anchored to insulator 20 and passes through insulator 21 as shown for enabling an external connection with the positive terminal of a power supply to resistor 15. The anode wire is usually around three thousandths of an inch in diameter but in one detector using the new gas a one thousandth inch wire was used to produce a more intense electric field in the vicinity of its periphery. An metal that does not degrade in the presence of the gas fill is suitable for an anode wire.

The cathode cylinder 18 is provided with diametrically opposite X-ray entrance and exit windows 23 and 24, respectively. Windows 23 and 24 are made as thin as possible, to reduce absorption of low energy photons, and thus assure that all available radiation is sensed. Suitable window materials have been found to be those sold under the trademarks "Formvar" and "Mylar." Mylar is commercially obtainable with a thickness of .00025 inch for use with the invention. Formvar is easily formed from its resin into suitable films of 100 micrograms per square centimeter. Mylar is usually preferred because it is tougher and obtainable in thin films. Formvar is known by the chemical name polyvinyl formal and Mylar is generically known as a polyester film which is the reaction product of ethylene glycol and terephthalic acid.

Windows 23 and 24 are adhered to supporting rings 25 and this assembly may be inset by an adhesive in counterbored recesses in the external periphery of cathode cylinder 18, as shown. The construction details are well known and need not be elaborated here.

Any photon entering window 23 whose energy is excessive may pass through exit window 24 without producing an ionizing event within cathode cylinder 18. Provision of exit window 24 minimizes the number of photons which might cause photoemission from the interior of the cathode cylinder 18 and thus spurious pulses are avoided or reduced as is known in the art.

The detector in FIG. 2 is provided with a gas flow inlet 26 and outlet 27 for continuously flowing ionizing gas through the detector 14. The flow rate is not particularly significant except that it should be at such level as to prevent inside pressure from building up lest the windows 23 and 24 be fractured. In practice, the flow rate is adjusted so that internal detector pressure is essentially atmospheric but exceeds that of the surrounding ambient by a few millimeters of mercury. This is sufficient to assure that air or helium, if that is the surrounding gas, will not flow into the detector and change its properties or affect its stability.

The nature of pulses that may be formed by the detector upon coincident entry of photons with different energies is illustrated in FIG. 3. The pulse with the greatest height 28 is produced by an energetic photon such as that characteristic radiation of the X-ray tube which is scattered by sample 11 as background, or it may be caused by photons from a relatively high atomic number element like iron which it would be desirable to eliminate if the detector is used for photons characteristic of a lower atomic number element. Pulse 29, with the lesser height, may be due to photons characteristic of a lower atomic number element such as aluminum which it is desired to preferentially detect. It will be observed that pulses, such as in FIG. 3, derived from a detector operated in the proportional range are characterized by a steep rise whose time is usually around one-tenth of a microsecond and by a relatively slow descent or tailing off for a duration of about two and one-half microseconds usually. Thus, it is evident that counting tens of thousands of pulses per second is theoretically possible, although in practice, the lower atomic number elements usually produce pulses at a rate of a few hundred per second and thereby tend to reduce statistical accuracy.

The new gas is uniquely adapted for making the detector 14 sensitive to photons in the low energy range and making it insensitive to photons of higher energy. Basically, the new gas comprises a mixture of nitrogen, helium and an organic quenching gas in appropriate proportions that are somewhat variable according to circumstances which will be discussed later. A mixture that has been found to be especially efficacious is one comprising 46% nitrogen (N), 46% helium (He) and 8% methane ($CH_4$). The sensitivity of the gas to photons of various energy is compared with the sensitivity of another gas in FIG. 4 through the agency of curves relating absorption efficiencies, or ionizing efficiencies, to the energy of incoming photons.

The upper curve 30 in FIG. 4 shows how absorption efficiency of a gas, like the commonly used P-10, which is a mixture of 90% argon and 10% methane varies for incoming photons of different energies. Curve 31 shows the same relationship for the new gas. The sharp discontinuity in curve 30 is due to the absorption edge of the argon-methane mixture occurring at a photon energy slightly below that of iron K alpha radiation. Photons with energy near the absorption edge may produce pulses that are of drastically different heights than those almost having the same energy but slightly on the short wavelength side of the edge. On the other hand, curve 31 from the new gas has no discontinuities in the operating photon energy range. It will be observed that the gas on which the absorption efficiency of curve 30 is based has substantially the same absorption efficiency for photons or characteristic radiation from a low atomic number element like aluminum as it does for a heavier element like iron. Pulses produced by a detector filled with P-10 gas have substantially the same height when affected by photons from either iron or aluminum K alpha radiation. The same problem has been encountered when other known gases were tried. Electronic discriminating devices are, therefore, ordinarily needed for distinguishing between pulses. Contrarily, the new gas has low absorption efficiency for energetic photons from an element like iron and even lower efficiency for radiation from higher atomic number elements and the harder scattered background radiation. The new gas has a satisfactory absorption efficiency for a light element such as aluminum. Use of the new gas, therefore, results in the detector acting as a discriminator which produces strong pulses for low atomic number elements and rejects or is insensitive to high energy photons.

By way of further explanation, the number of pulse counts obtained from a detector tube with a 0.00025 inch Mylar entrance window exposed to iron K alpha radiation was nineteen times greater with an argon-methane gas fill than with the new gas. This is another way of saying that the new gas is insensitive to high energy radiation. Both gases are nearer to the same sensitivity for soft radiation as is demonstrated by chlorine K alpha radiation which yielded 2.2 times as many pulses per second as the P-10 gas and aluminum K alpha radiation which yielded 1.17 times as many.

The concentration of constituent gases in the new mixture may be changed somewhat to suit circumstances. The volume concentration of helium gas, which is primarily a diluent and affects the voltage which must be applied to the detector tube in order to trigger an ionizing event, may range from approximately 15% to 85% by volume. The nitrogen which is a principal ionizing agent may be varied over a volume concentration range of approximately 15% to 85%. Methane or other hydrocarbon gas that serves as a quenching agent, should remain fairly near 8% by volume and any change in the quantity of nitrogen should be made at the expense of helium. However, the methane or other hydrocarbon may be varied between 3% and 12% without experiencing intolerable spurious counts due to photo-emission from the cathode cylinder caused by positive ions impinging on it after the electrons produced during a pulse are collected.

The exact percentage of each gas in the mixture depends to a large extent upon the photon energy which is to be emphasized by a particular detector. In FIG. 5 it is seen that the logarithm (Ln) of the mass absorption coefficient of nitrogen, which is the highest among the constituents dictates that using more of it will increase the absorption coefficient, and hence, the efficiency of the gas mixture. On the other hand, use of more helium will reduce absorption over the desired energy although a reduced starting potential results. A consideration of all factors, particularly the desirability of repetitively purchasing a gas with uniform proportions, suggests that the most universally applicable of volume concentrations are 46% helium, 46% nitrogen and 8% methane. This mixture was found especially satisfactory for use in a detector whose cathode envelope 18 had an internal diameter of one inch and a tungsten anode wire of .001 inch diameter.

One limitation must be observed in connection with choice of a quenching gas that will produce the efficient photon energy discriminating capability of the new gas mixture. It is that the quenching gas should not include any elemental component whose atomic number is higher than ten. If gases above number ten are used they will cause an absorption edge discontinuity to appear as is the case with the argon-methane mixture illustrated in FIGS. 4 and 5. An edge appearing near 1.487 kilovolt photon energy would destroy the efficacy of detection of elements near aluminum. This rules out the halogen quenching gases such as chlorine and bromine or any compound containing them. Almost any known organic quenching gas such as the hydrocarbons and other polyatomic compounds composed of elements below number 10 may be used, however.

In summary, there has been described an X-ray emission analyzer that features an X-ray detector tube and a new gas filling therefor which is especially sensitive to photons characteristic of low atomic number elements. Thus, there may be omitted from the analyzer pulse height selectors and discriminators without suffering loss of resolution in the channel for low atomic number elements in the vicinity of aluminum.

Although the detector and new gas fill has been described in connection with a device for emission analysis, it has general application such as in X-ray diffraction or transmission technics. Accordingly, the foregoing description is to be considered illustrative rather than limiting and the scope of the invention is to be determined by construing the claims which follow.

It is claimed:

1. An X-ray emission analyzer comprising an X-ray source providing a primary beam in which a sample may be disposed for exciting characteristic radiation from an element of interest in the sample and incidental to which other radiation is yielded by the sample, an X-ray detector receiving a part of both radiations, said detector having a gas fill comprising a mixture of nitrogen, helium and quenching gas in such proportions as to be more sensitive to ionization by characteristic radiation than to the other radiation.

2. The invention set forth in claim 1 wherein the characteristic radiation from the element of interest has relatively low photon energy and the other radiation is background radiation having a relatively higher energy.

3. For use in a proportional detector of the gas flow type, an ionizing gas consisting of a mixture of essentially 46% nitrogen, 46% helium and 8% methane.

4. For use in a proportional detector of the gas flow type, an ionizing gas comprising a mixture of nitrogen between 15% and 85% by volume, and helium between 15% and 85% by volume, and the remainder of a quenching gas in an amount ranging between 3% and 12% by volume.

5. The invention set forth in claim 4 wherein said quenching gas is constituted of elements each of which has an atomic number no greater than 10.

6. An X-ray emission analyzer comprising an X-ray source providing a primary beam in which a sample may be disposed for exciting low energy characteristic K alpha radiation from elements whose atomic number is in the vicinity of aluminum and incidental to which excitation other higher energy radiation corresponding with that from those elements whose atomic numbers are in the vicinity of iron or higher is yielded by the sample, an X-ray detector means receiving a part of both radiations, said detector means having an ionizing gas flowing therethrough comprising a mixture of nitrogen, helium and a quenching gas in such proportions that the gas is more effectively ionized by the low energy radiation than by the higher energy radiation, said quenching gas being present in an amount between 3% and 12% by volume and constituted by elements each of which has an atomic number no greater than 10.

References Cited in the file of this patent

UNITED STATES PATENTS

| | | |
|---|---|---|
| 2,924,715 | Hendee | Feb. 9, 1960 |
| 2,925,509 | Hayes | Feb. 16, 1960 |